No. 790,297. Patented May 23, 1905.

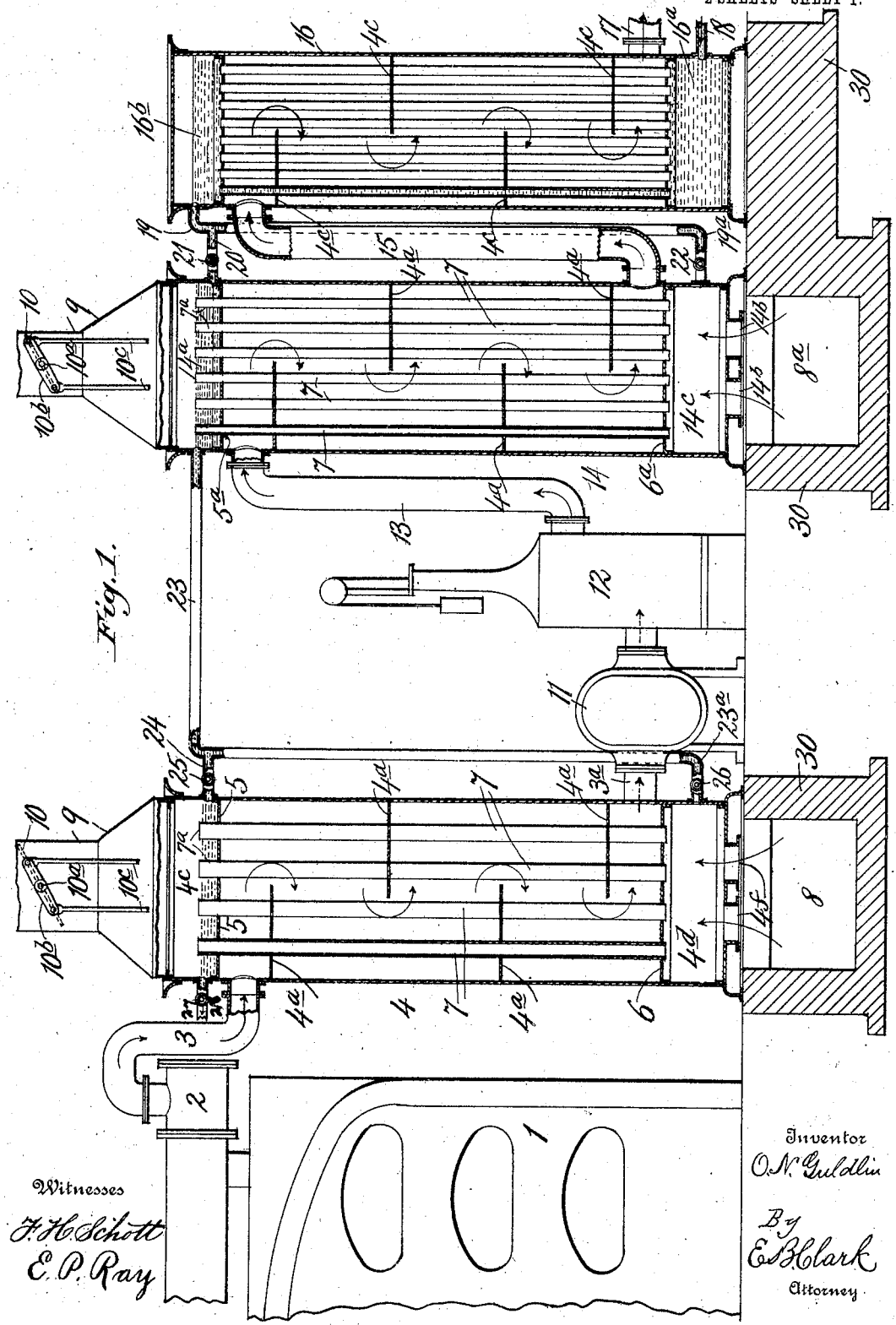

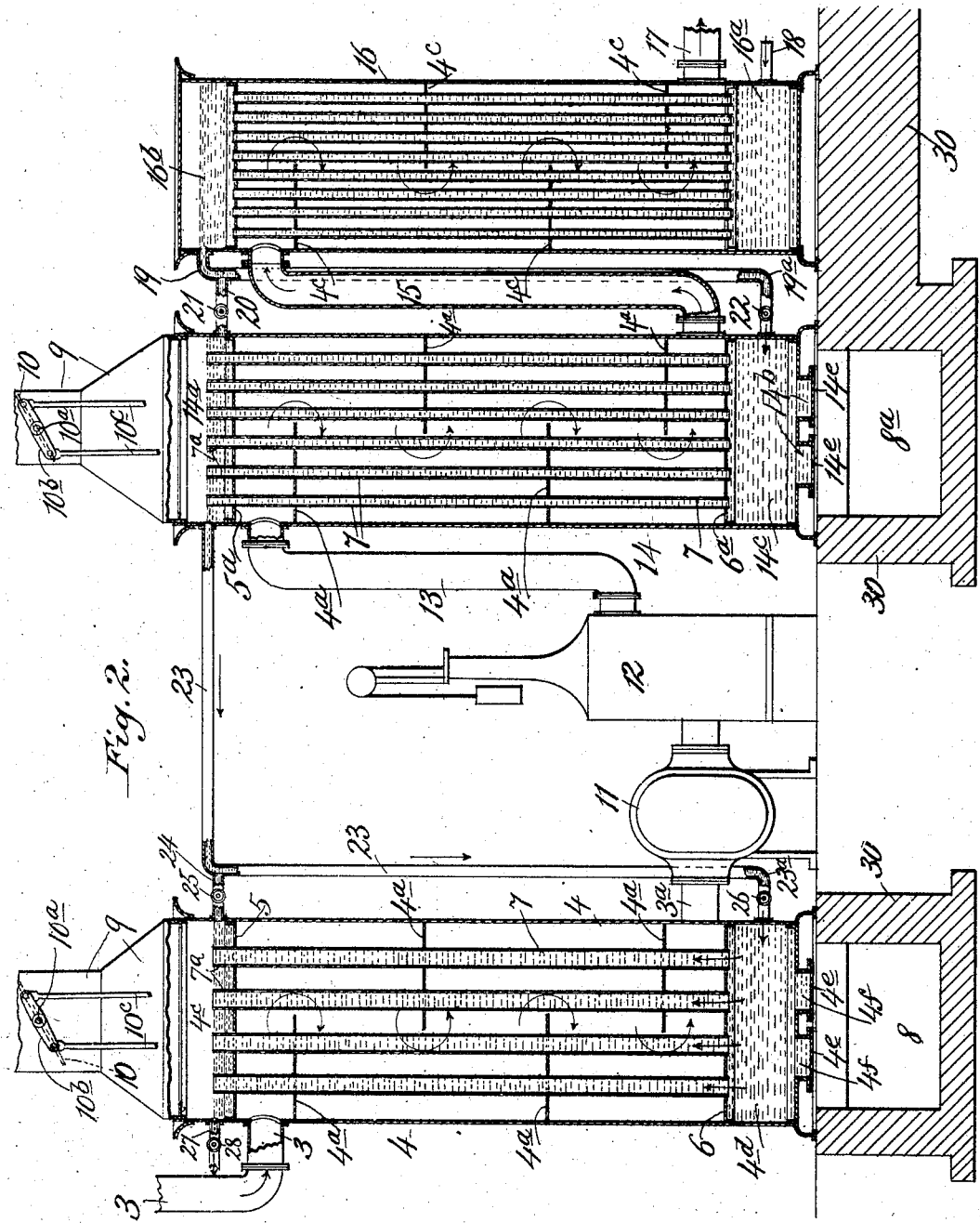

UNITED STATES PATENT OFFICE.

OLAF N. GULDLIN, OF FORT WAYNE, INDIANA.

GAS-CONDENSING APPARATUS.

SPECIFICATION forming part of Letters Patent No. 790,297, dated May 23, 1905.

Application filed December 1, 1902. Serial No. 133,465.

*To all whom it may concern:*

Be it known that I, OLAF N. GULDLIN, a citizen of the United States, residing at Fort Wayne, in the county of Allen and State of Indiana, have invented certain new and useful Improvements in Gas-Condensing Apparatus; and I do hereby declare the following to be a full, clear, and exact description of the invention, such as will enable others skilled in the art to which it appertains to make and use the same.

This invention relates to apparatus for condensing and cooling gas and removing tar therefrom at a regulated, controlled, and practically uniform temperature during the operation.

One of the objects of my invention is to provide for controlling the temperature of the gas after it leaves the retort or other generator and before it enters the tar-extractor, so that tar may be extracted without absorbing volatile illuminants and thereby impoverishing the gas.

Another object of my invention is to provide a construction and arrangement of condensers which may be conveniently and effectively cooled by either air or water or by both air and water and which may be termed "combination air and water condensers."

The matter constituting my invention herein will be defined in the claims.

I will now describe the construction and operation of my improved condensing apparatus by reference to the accompanying drawings, in which—

Figure 1 represents a sectional elevation of the condensing, cooling, and tar-extracting apparatus. Fig. 2 represents a sectional elevation of the condensing apparatus arranged for cooling the condensers with water to the exclusion of air.

During a large part of the year, when the temperature is cool, the external air may be effectively used for cooling the primary and secondary condensers—and additional condensers, if required—resulting in a large saving of water. At certain periods of the year and under certain conditions in the manufacture of gas it is advantageous to pass both air and water through the tubes of the condensers for obtaining the most satisfactory results. Again, at other periods and under other conditions it may be most advantageous and desirable to use water alone for passage through the tubes of the primary and secondary condenser, as well as through the multitubular condenser. It is therefore desirable to present cooling-surfaces of varying efficiency to suit the volume of gas being made at any time for the purpose of gradually and slowly cooling the gas. My apparatus is constructed for meeting these varying conditions and securing the most economical, gradual, and uniform results in the cooling, condensing, and tar-extracting operations.

The bench of retorts 1, the hydraulic main 2, and the gas-take-off pipe 3 are of the usual well-known construction. Gas leaves the hydraulic main at a temperature between 140° and 160° Fahrenheit, and in order to reduce it to the proper temperature for the effective and economical extraction of tar without loss of illuminants it is first passed through the primary tubular condenser 4. The condensers 4, 14, and 16 are set upon foundations 30 of stone or concrete. The primary tubular condenser 4 is constructed with upper and lower tube sheets or heads 5 and 6, through which are connected the vertical air and water tubes 7, and said sheets form the top outlet-chamber $4^e$ and the bottom inlet-chamber $4^d$. The bottom of the shell is provided with air-inlet openings $4^f$, which communicate with the air-tunnel 8 in the foundation 30, extending, preferably, to the outside of the building. When desired, the openings $4^f$ are closed by plates or lids $4^e$, Fig. 2, which may be hinged and secured in place in any well-known manner. The transverse baffle-plates $4^a$ in any desired number are secured to the inner wall of the shell alternately at opposite sides thereof, as shown, and serve to deflect the gas entering through pipe 3, back and forth around and in contact with the cooled tubes, till it passes out through the pipe $3^a$, which connects with the exhauster 11. At the top the condenser is provided with a hood and stack 9, in which latter is placed a regulating damper or valve 10, having a shaft $10^a$, to which is attached a cross-bar $10^b$, to the ends of which are pivotally connected the rods 10ᶜ for operating the damper. This damper serves to control the amount of air passed through the tubes according to the make of gas and the temperature of the outer air. It is important that the temperature of the gas passing through the primary condenser be controlled and maintained so that it will leave the condenser at a temperature not less than 90° to 100° Fahrenheit and preferably between 90° and 120° Fahrenheit, at which the remaining tar is removed.

The secondary condenser 14 is made substantially like the primary condenser, with upper and lower tube-sheets 5ᵃ and 6ᵃ, tubes 7, baffle-plates 4ᵃ, upper and lower chambers 14ᵃ and 14ᶜ, air-inlets 14ᵇ, hood and stack 9, provided with regulating-damper 10 and its attachments 10ᵃ, 10ᵇ, and 10ᶜ. An air-tunnel 8ᵃ is also made in the foundation 30 below the condenser and leads, preferably, outside of the building. The upper tube sheets or heads 5 and 5ᵃ are secured a short distance below the upper ends of the tubes to form a water receptacle or pan, as shown, and the water supply and outlet pipes are connected at a suitable height above the plates to provide a shallow body of water in each of the chambers 4ᶜ and 14ᵃ. By means of the upwardly-projecting tube ends 7ᵃ and the connection of overflow water-pipes 23, 24, and 27 with the shells of chambers 4ᶜ and 14ᵃ at a level with the top ends of the tubes I provide water-receptacles, and by providing valves 25 and 28 in said overflow-pipes water may be caused to flow in thin films down the interior surfaces of the tubes 7 and be passed off through the tunnels 8. Without the upwardly-projecting tube ends and the valved inlet and overflow water pipes, the quantity of water passed into the tubes could not be controlled and they would be liable to be flooded and the flow of air through them interrupted. It is desirable that only thin films of water be passed down the tubes while air is passing up the tubes, so as to facilitate the evaporation of water, and thereby increase the cooling effect. The gas-pipe 3ᵃ connects with the lower end of the shell of the primary condenser 4 and with the exhauster 11, which in turn connects with a mechanical tar-extractor 12, of any suitable construction, but preferably an extractor of the Pelouze and Audouin type, which extracts tar by impact and precipitation in a well-known manner. The operation of extracting tar at a regulated temperature, so as to prevent loss of volatile illuminants, is described and claimed in my Patent No. 731,412 for method of treating gas. A pipe 13 connects the tar-extractor 12 with the upper part of the secondary condenser 14, and a pipe 15 connects the lower end of the tube-chamber of this condenser with the upper part of the multitubular water-condenser 16, which is constructed in a well-known manner and is provided at the bottom with the inlet water-chamber 16ᵃ and at the top with the outlet water-chamber 16ᵇ, which may be open or closed at top. Baffle-plates 4ᶜ are also secured in the tube-chamber. The outlet gas-pipe 17, connecting with the lower end of the tube-chamber, may lead to the gas washer and scrubber. (Not here shown.)

The cold-water-supply pipe 18 connects with chamber 16ᵃ, and the outlet-pipe 19 connects with the top chamber 16ᵇ of condenser 16 and connects by a branch 20, having a valve 21, with chamber 14ᵃ and by a lower branch 19ᵃ, having a valve 22, with chamber 14ᶜ of the secondary combination air and water condenser 14. An overflow-pipe 23 connects with the outlet-chamber 14ᵃ at the proper height for maintaining a body of water therein and connects by a branch 24, having a valve 25, with the upper outlet-chamber 4ᶜ and by a branch 23ᵃ, having a valve 26, with the inlet-chamber 4ᵈ of the primary combination air and water condenser 4. An overflow-pipe 27 for hot water, having a valve 28, connects with chamber 4ᶜ and may lead to a storage-tank. (Not here shown.)

By means of the regulating-damper 10 in the primary condenser the temperature of the varying volume of gas, which may vary from day to day or from month to month, may be uniformly controlled. If a comparatively large volume of gas is being generated and passed through the condenser, the damper 10 is more widely opened and a larger quantity of air passed through the tubes. Again, if the temperature of the outside air is higher then a larger quantity is passed through the tubes. As the temperature of the outer air falls the quantity passed through the tubes will be correspondingly reduced. By means of this primary condenser, therefore, the temperature of the gas can at all times be controlled so as to maintain it at a practically uniform temperature above 90° Fahrenheit as it passes out of the condenser to the exhauster and tar-extractor 12. In the secondary condenser 14 the gas is preferably reduced to about 80° Fahrenheit for final reduction to 60° in condenser 16, when it will be in the best condition for extraction of the ammoniacal compounds during the washing and scrubbing operations. The water overflowing from chamber 16ᵇ of condenser 16 may with great advantage be passed through pipe 20 and its valve 21 into chamber 14ᵃ and out through pipe 23 into chamber 4ᶜ or caused to overflow through the cooling-tubes 7 in condenser 14, so that a film of water shall be passing down while air is passing up through each of the tubes. By closing valve 25 the water admitted to the receptacle in chamber 14ᵃ will be caused to flow over the upwardly-projecting tube ends 7ᵃ and pass in thin films down the interior surfaces of the tubes. The amount of water admitted to the receptacle is controlled by valve 21, so that the tubes shall not be flooded with water. By partly opening valve 25 part of the water may be passed into chamber 4$^c$ and caused to flow over the upwardly-projecting tube ends 7$^a$ and in thin films down the interior surfaces of the tube in condenser 4. It is to be noted that the tube ends 7$^a$ do not project quite so high in chamber 4$^c$ as in chamber 14$^a$, so that the water may be caused to flow as above described. By means of valve 28 part or all of the water admitted to chamber 4$^b$ may be drawn off through pipe 27. The cooling effect of the water is thus obtained and in addition the cooling effect due to evaporation of the water. The cooling effect of currents of air passing through the tubes is also obtained. If preferred, the air may be shut off by closing the covers or plates 14$^e$ on their seat at the lower end of the condenser. When it is desired to more fully utilize the overflow water from condenser 16, the bottom plates 14$^e$ of condenser 14 will be secured on their seats, valve 21 closed and valve 22 opened, thereby causing the water to flow up through the tubes and off through pipe 23. By opening valve 25 in pipe 24 the water will flow into chamber 4$^c$ and out through pipe 27 or down the tubes in condenser 4, or by closing valve 25 and opening valves 26 and 28 the water will flow up through the tubes 7 and thence off through pipe 27, it being understood that the covers 4$^e$ are then closed on their seats.

It will thus be seen that my combination air and water condensers are readily convertible and adapted to cooling by air alone, air and water, or water alone, according to volume of gas to be treated and to the atmospheric conditions. Great economy and effectiveness are secured in the operation of the condensers, besides insuring the very important feature of gradually cooling the gas essential in the treatment of coal-gas.

Where hollow foundations 30 cannot be conveniently constructed in any particular location, the openings 4$^f$ and 14$^b$ may be located on the sides of the chambers 4$^d$ and 14$^c$, and preferably in the form of square or rectangular manholes and provided with tight-fitting covers. In this case the air will generally be drawn into the condensers from the surrounding atmosphere.

The baffle-plates 4$^a$ in the condensers greatly increase the cooling effect of the tubes, for the reason that they cause the gas to travel back and forth at right angles to the tubes, thereby greatly increasing the length of travel, and consequently increasing the heat-absorbing efficiency of the tubes. They have been found very effective and advantageous in practice.

Water may be supplied to the air-inlet chamber of the foundation 30 and passed off through a suitable drain, over which the air will be passed and thereby cooled before entering the tubes. The water in chambers 4$^c$ and 14$^a$ keeps the tube-sheets cool, preventing undue expansion and contraction and consequent leaks at the joints of the tubes.

Though the water-condenser 16 is shown in the drawings with a closed top, it is generally constructed with an open top, so that the water will be free to rise up toward the top and give additional head for the flow of water into the chamber 14$^a$ of condenser 14. When a closed top is used, it should be provided with a vent for the escape of air and to prevent the formation of an air-cushion in the top of the chamber.

Having described my invention, what I claim, and desire to secure by Letters Patent, is—

1. A tubular gas cooler and condenser having at the lower end an air inlet and chamber opening into the tubes, and at the top an air-outlet provided with a damper or valve for regulating and controlling the flow of air, and thus regulating the temperature of the gas, also having at the top a water-receptacle, upwardly-projecting tube ends therein, and means for controlling the supply to, and discharge of water from, said receptacle, and gas inlet and outlet pipes connecting with the shell inclosing the tubes, substantially as described.

2. The combination with an upright tubular condenser, having an air inlet and chamber opening into the tubes at the bottom and an outlet-chamber and tube sheet or head at the top, through which project the tube ends 7$^a$, of a water-supply pipe having a valve opening above said head, whereby water may be caused to cool the head and to flow in films down the tubes while air is passed up through them, and gas inlet and outlet pipes connecting with the shell inclosing the tubes, substantially as described.

3. A tubular gas cooler and condenser, constructed with upper and lower tube sheets or heads, tubes extending through the same and having upwardly-projecting ends 7$^a$, inlet and outlet chambers for the cooling fluid at top and bottom, water supply and overflow pipes connecting with the upper chamber above the tube-sheet, transverse baffle-plates extending from opposite sides of the shell for deflecting the gas back and forth around the tubes, gas inlet and outlet pipes connecting with the shell, substantially as described.

4. The combination with a gas cooler and condenser, constructed with upper and lower tube-sheets, connecting-tubes, an inlet-chamber at the bottom having an air-inlet, and an outlet-chamber at the top, of a water-supply pipe, having a valve, connecting with the bottom inlet-chamber, a water-outlet pipe connecting with the top outlet-chamber and means for closing said air-inlet, substantially as described.

5. The combination with a gas cooler and condenser, constructed with upper and lower tube-sheets, connecting-tubes, upper and lower inlet and outlet chambers for cooling fluid having air inlet and outlet openings, of a valved water-supply pipe connecting with the upper chamber, an outlet water-pipe connecting with said chamber, a valved water-supply pipe connecting with the lower chamber, and means for closing said air-inlet, substantially as described.

6. The combination with a multitubular water-cooled condenser having a water chamber and supply pipe at the bottom and an outlet-chamber at the top, of a tubular air-condenser having upper and lower tube-sheets, connecting-tubes having upwardly-projecting ends above the upper tube-sheet, an air-inlet at the bottom and an air-outlet chamber at the top provided with a controlling valve or damper, and a valved water-pipe connecting the top chamber of the water-condenser with the top chamber of the air-condenser, and an overflow water-pipe connecting with said chamber above the tube-sheet, substantially as described.

In testimony whereof I affix my signature in presence of two witnesses.

OLAF N. GULDLIN.

Witnesses:
THEO. H. SCHEUMANN,
R. S. ROBERTSON.